(12) United States Patent
Schuessler et al.

(10) Patent No.: US 8,859,670 B2
(45) Date of Patent: Oct. 14, 2014

(54) POLYOLEFIN COMPOSITION

(75) Inventors: Stephan Schuessler, Caldern (DE); Michaela Lendl, Schaffhausen (CH); Bernd Kretzschmar, Radebeul (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 231 days.

(21) Appl. No.: 13/322,064

(22) PCT Filed: May 20, 2010

(86) PCT No.: PCT/EP2010/056932
§ 371 (c)(1),
(2), (4) Date: Nov. 22, 2011

(87) PCT Pub. No.: WO2010/136370
PCT Pub. Date: Dec. 2, 2010

(65) Prior Publication Data
US 2012/0070598 A1    Mar. 22, 2012

(30) Foreign Application Priority Data

May 25, 2009  (CH) .................................... 00803/09

(51) Int. Cl.
*C08K 3/04* (2006.01)
*B29D 22/00* (2006.01)

(52) U.S. Cl.
CPC ...................................... *C08K 3/04* (2013.01)
USPC ......................................... 524/496; 428/36.9

(58) Field of Classification Search
USPC .......................................................... 524/496
See application file for complete search history.

(56) References Cited

U.S. PATENT DOCUMENTS

| | | | | |
|---|---|---|---|---|
| 5,461,096 | A * | 10/1995 | Bopp et al. ..................... | 524/145 |
| 7,479,516 | B2 * | 1/2009 | Chen et al. ..................... | 524/495 |
| 7,938,996 | B2 * | 5/2011 | Baughman et al. ............ | 264/108 |
| 8,455,583 | B2 * | 6/2013 | Krishnamoorti et al. ..... | 524/496 |
| 2004/0106719 | A1 * | 6/2004 | Kim et al. ...................... | 524/445 |
| 2006/0001013 | A1 * | 1/2006 | Dupire et al. .................. | 252/511 |
| 2008/0275177 | A1 * | 11/2008 | Chu et al. ...................... | 524/496 |
| 2009/0008611 | A1 * | 1/2009 | Oriji et al. ..................... | 252/511 |
| 2009/0023851 | A1 | 1/2009 | Bierdel et al. | |
| 2009/0176911 | A1 * | 7/2009 | Abecassis et al. ............ | 523/351 |
| 2010/0230131 | A1 * | 9/2010 | Han et al. ............... | 174/110 PM |

FOREIGN PATENT DOCUMENTS

| | | |
|---|---|---|
| EP | 1349179 | 10/2003 |
| EP | 2028218 | 2/2009 |
| WO | 2006/096203 | 9/2006 |
| WO | 2008/041965 | 4/2008 |
| WO | 2009/000408 | 12/2008 |
| WO | 2009/027357 | 3/2009 |

* cited by examiner

*Primary Examiner* — Hui Chin
(74) *Attorney, Agent, or Firm* — Bachman & LaPointe, P.C.

(57) ABSTRACT

A polyolefin composition having an increased modulus of elasticity as well as increased heat resistance, wherein the polymer composition has high melt viscosity, and wherein the composition contains a carbon material as a filler, wherein the filler is present in the form of a carbon nanofiber.

10 Claims, No Drawings

POLYOLEFIN COMPOSITION

BACKGROUND OF THE INVENTION

The invention relates to a polymer composition having an elasticity modulus increased relative to that of the pure polymer matrix, with a simultaneously increased heat distortion resistance, notched impact strength, retention or improvement in the profile of the chemical stability, and a reduction in the creep tendency, the polymer composition comprising as filler a carbon material.

In pipeline construction, pipelines made of polyolefins and polyolefin compositions are used. For the most common areas of application, polyethylene, polypropylene, polybutylene and polyvinyl chloride compositions are adequately available on the market. Enhanced materials with a higher elasticity modulus and a simultaneously increased heat distortion resistance, which can be used in specialty areas of application such as the transport of aggressive media, are not available at affordable prices. The focal points in the development of new plastics compositions lie in the areas of coextrusion, functional coating, drawing, and thermoset/fiber composites. The development programs of the raw materials manufacturers take no account primarily of affordable plastics compositions suitable for the extrusion of pipelines.

The improvement in the profiles of properties of the raw materials used in plastics pipeline construction has seen no significant further advance in recent years. As far as we are aware, innovations have been primarily in the area of enhancements through extrusion, functional coating, biaxial drawing or reinforcement by thermoset/fiber composites.

In the industrial pipe segment, the name manufacturers, with regard to polyolefins (PE, PP, PB), have already achieved, on the raw materials side, a comparable high quality level, with the consequence that market promotion is increasingly coming down to a pure price proposition. In many applications, a similar development can be seen in the area of PVC materials.

In the plastics industrial pipe segment, the desire of the users for significant—but also affordable—improvements in materials is known. As a result of the comparatively small size of this segment, however, this desire has not met sufficient priority on the part of the raw materials manufacturers for a number of years.

Known systems are the reinforcement of plastics by means of fillers→C fillers→C-based nanofillers, published in US 2006 0001013A1, WO 2008/041965 A2 or WO 2009/000408 A1.

Furthermore, the dispersion problems of C-based fillers and nanofillers are described in WO 2009/000408 A1.

Only through homogeneous dispersion is it possible for the nanofillers to develop their properties; conclusions are independent of the nature of the nanofillers.

The factors governing the dispersibility of a nanofiller include size, surface structure, chosen matrix, its molecular weight/melt viscosity, and the method of compounding that is selected (machine composition, number of stages, etc.). Furthermore, system-specific compatibility additives can be used, as described in U.S. Pat. No. 7,479,516 B2 or WO 29027357A1.

The system compatibilities of nanofillers with a selected polymer can usually not be simply transposed to other classes of polymer, but instead require individual adaptation. Even simply the lowering of the melt viscosity of the polymers from typical injection molding grades to extrusion grades raises entirely new issues with regard to the dispersion of nanofillers. Ways of dispersion described to date in patent literature for CNT/CNF are as follows: WO 29027357 A1, US 2009 0008 611, WO 2006096203 A2, EP 2028218 A1, US 2006 001013 A1 and WO 2008041965 A2.

The fundamental advantage of CNT/CNF reinforced polymers is known theoretically in the literature (good energy transport properties, improved mechanical properties, with lower degrees of filling as compared with conventional carbon black filling).

The consequences of the reinforcement of polymers matrices with C-based nanofillers for the chemical stability profile of the material have so far not been described in the literature.

Fundamental attractiveness of the carbon nanofiller approach for polymers for industrial plant construction/pipeline construction. Expectations:

Clearly defined chemical stability profile, provided fillers are not chemically surface-modified, or compatibilizers are used.

Expected significant increase in stiffness, strength, and toughness.

Synergy through integration of improved energy transport properties.

Improvement in the price/performance ratio of the products.

Improvement in the pressure pipe properties of the creep behavior.

Retention or improvement in the barrier properties with respect to chemicals.

The objective of the invention is the production of a CN filler composite based on a polymer (polyolefin) of high melt viscosity which is established in industrial pipeline construction (MFR class <2 g/10 min, ISO 1133, method 190/5). Ensuring homogeneous filler dispersion.

the use of non-modified, commercial carbon nanofillers in a conventional compounding technology, and also omission of compatibilizers.

the definition of a suitable filler. Specification of ideal filler quantities.

the significant improvement of the pipe-relevant materials properties (thermal, mechanical, energy transport) relative to the pure matrix material, especially increase in thermal conductivity.

the retention or improvement of the chemical stability behavior of the new material.

the development of a single material formula with potential for the manufacture of all pipeline system components (pipe, moldings, plates, solid rods, welding wire).

The key challenges for the invention are the retention of or improvement in the pressure resistance (MRS class), the significant (as far as possible >30%) increase of stiffness and impact strength (particularly for PP), the thermal conductivity, the retention of the relative improvement when the service temperature is raised, the improvement of the chemical stability, and the additional benefit, an example being the reduction in thermal expansion and/or the improvement in energy transport properties.

EP 2 028 218 A1 discloses a polymer composition which besides polyolefins and polyhydroxycarboxylic acid as copolymer further comprises carbon nanotubes. The polymer composition may be used, for example, in heat exchangers, where good thermal conductivity is required. The electrical conductivity can be improved as well. Because the carbon nanotubes tend toward agglomeration, homogeneous mixing of the new composition is difficult to achieve. As a consequence of this, mechanical weak points in the end product cannot be ruled out. The polymer matrix is prepared using a metallocene catalyst. The melt viscosity or MFI (melt flow index) of the polymer composition is so unfavorable that pipes or plastic moldings cannot be produced economically by the injection molding process.

Starting from this prior art, it is an object of the invention to specify a polymer composition which is easy to prepare and which, with production costs that are as low as possible, exhibits mechanical properties that are as good as possible, and which can be processed in the injection molding process. Achievement of this object will also allow a plastics material to be offered that is suitable for aggressive media.

SUMMARY OF THE INVENTION

The foregoing object is achieved by the filler being present in the form of a nanofiller, more particularly in the form of carbon nanofibers.

DETAILED DESCRIPTION

The polymer composition may be a polyolefin having a melt index of less than 2 g/10 min in accordance with method 190/5 to ISO 1133.

Preferred developments of the invention are apparent from the dependent claims.

The individual components are now described:
Polymer basis: Hostalen, PPH 2222 gray; MFR (190/5): 0.5 g/10 min.
Nanofillers:
CNT: Nanocyl 7000; Nanocyl SA.; MWCNT; no details of geometry; 90% C fraction; 10% metal oxide content; 250-300 g/m$^2$ surface area
CNF: VGCF-H; Showa Denko, diameter: 150 nm: length=10-20 μm; aspect ratio~100; 13 m$^2$/g surface area; no information on purity
Concentration ratios:CNT: 1%, 2%, 5% and 10% by weight
CNF: 5/10% by weight
a) Compounding operation:
For the better dispersion of the MWNT and also in order to observe the necessary accuracy of the small proportions in the formulations, a masterbatch (90% Hostalen PP H2222+10% MWNT Nanocyl 7000) was compounded, and in subsequent extrusion steps was diluted to give the desired composition of the formulations.

The masterbatch was compounded using a closely intermeshing, co-rotating laboratory twin-screw extruder.

The system presented here thus describes for the first time the possibility of using commercially available CNF and a state-of-the-art compounding technology, along with a high-viscosity polyolefin material which is established in industrial plant construction, to produce a new composite material distinguished by the following properties:
increase in stiffness by >40%
increase in strength by >7%
increase in notched impact strength by 50%
increase in heat distortion resistance by <27%
attainment of a volume conductivity of 7.5*104*Ω*cm
retention of crystallinity and oxidation stability
improvement in thermal conductivity
reduction in thermal expansion by 20%
improvement in chemical stability profile.

The invention claimed is:

1. A polymer composition having an elasticity modulus increased relative to that of the pure polymer matrix, with a simultaneously increased heat distortion resistance, notched impact strength, retention or improvement in the profile of the chemical stability, and a reduction in the creep tendency, the polymer composition comprising as filler a carbon material, wherein the filler is present in the form of a nanofiller comprising carbon nanofibers homogeneously distributed in the polymer matrix, wherein the polymer composition comprises a polyolefin having a melt index of less than 2 g/10 min in accordance with method 190/5 to ISO 1133, wherein the carbon nanofibers are not chemically surface-modified.

2. The polymer composition as claimed in claim 1, wherein the polymer is a high-density polyethylene.

3. The polymer composition as claimed in claim 2, wherein the polymer is a crosslinked polyethylene.

4. The polymer composition as claimed in claim 1, wherein the polymer is a polypropylene.

5. The polymer composition as claimed in claim 1, wherein the carbon nanofiber filler has a weight fraction of less than 30% by weight.

6. A process for preparing a polymer composition having an elasticity modulus increased relative to that of the pure polymer matrix, with a simultaneously increased heat distortion resistance, notched impact strength, retention or improvement in the profile of the chemical stability, and a reduction in the creep tendency, the polymer composition comprising as filler a carbon material, wherein the filler is present in the form of a nanofiller comprising carbon nanofibers homogeneously distributed in the polymer matrix, wherein the polymer composition comprises a polyolefin having a melt index of less than 2 g/10 min in accordance with method 190/5 to ISO 1133, the process comprising the steps of introducing the carbon nanofibers and homogeneously distributing the carbon nanofibers in the polymer matrix by direct compounding or masterbatch in a pure polymer matrix, wherein the compounding is carried out without compatibilizers, wherein the carbon nanofibers are not chemically surface-modified.

7. The process as claimed in claim 6, including forming the polymer composition by conventional extrusion into industrial pipeline construction or plant construction for the transport of aggressive gaseous or liquid media.

8. The process as claimed in claim 6, including forming the polymer composition by conventional extrusion to give pipes, plates or rods or by injection molding to give injection moldings.

9. The polymer composition as claimed in claim 1, wherein the polymer composition includes conventional additives for increasing the thermal conductivity.

10. The process as claimed in claim 6, including forming the polymer composition into heat exchangers.

* * * * *